(12) United States Patent
Rigor

(10) Patent No.: US 11,256,663 B2
(45) Date of Patent: Feb. 22, 2022

(54) CACHING WITH DYNAMIC AND SELECTIVE COMPRESSION OF CONTENT

(71) Applicant: Verizon Digital Media Services Inc., Dulles, VA (US)

(72) Inventor: Paul Rigor, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

(21) Appl. No.: 16/995,456

(22) Filed: Aug. 17, 2020

(65) Prior Publication Data

US 2020/0401558 A1 Dec. 24, 2020

Related U.S. Application Data

(62) Division of application No. 15/814,856, filed on Nov. 16, 2017, now Pat. No. 10,747,723.

(51) Int. Cl.
| | |
|---|---|
| *G06F 15/16* | (2006.01) |
| *G06F 16/172* | (2019.01) |
| *H04L 67/1097* | (2022.01) |
| *H04L 67/568* | (2022.01) |
| *H04L 69/04* | (2022.01) |

(52) U.S. Cl.
CPC ........ *G06F 16/172* (2019.01); *H04L 67/1097* (2013.01); *H04L 67/2842* (2013.01); *H04L 69/04* (2013.01)

(58) Field of Classification Search
CPC ............... G06F 16/172; H04L 67/1097; H04L 67/2842; H04L 67/04
USPC ........................................................ 709/217
See application file for complete search history.

(56) References Cited

U.S. PATENT DOCUMENTS

| | | | | |
|---|---|---|---|---|
| 7,092,997 | B1 * | 8/2006 | Kasriel | H04L 67/2895 709/213 |
| 7,188,214 | B1 * | 3/2007 | Kasriel | H04L 69/04 711/118 |
| 7,765,274 | B2 * | 7/2010 | Kasriel | H04L 67/02 709/217 |
| 8,447,948 | B1 * | 5/2013 | Erdogan | G06F 12/0871 711/173 |
| 9,235,590 | B1 * | 1/2016 | Wang | H03M 7/6064 |
| 10,015,560 | B2 * | 7/2018 | Mao | H04N 21/64769 |
| 10,044,826 | B2 * | 8/2018 | Knecht | H04L 67/02 |

(Continued)

*Primary Examiner* — Alicia Baturay
(74) *Attorney, Agent, or Firm* — Ansari Katiraei LLP; Arman Katiraei; Sadiq Ansari

(57) ABSTRACT

Dynamic and selective compression for content caching is provided for improving content delivery over a digital network. The dynamic and selective compression increased server cache size for higher cache-hit ratios that offset delays associated with compressing and decompressing content. The dynamic compression involves switching between an available set of compression tools in order to compress different files with the compression tool that is optimal for that file. The selective compression involves selectively compressing the content or files with the optimal compression tool when at least a threshold amount of space savings is obtained in an acceptable amount of time. Thus, the caching server caches compressed copies of a first set of files compressed with a first compression tool, compressed copies of a second set of files compressed with a different second compression tool, and an uncompressed third set of files.

22 Claims, 8 Drawing Sheets

(56) References Cited

U.S. PATENT DOCUMENTS

| | | | |
|---|---|---|---|
| 10,164,029 B2 | 12/2018 | Chang et al. | |
| 10,165,029 B2* | 12/2018 | Basile | H04L 67/2842 |
| 10,256,977 B2* | 4/2019 | Weinstein | H04L 9/3239 |
| 10,466,932 B2* | 11/2019 | Romanovskiy | G06F 3/0619 |
| 10,747,723 B2* | 8/2020 | Rigor | H04L 67/1097 |
| 10,779,028 B2* | 9/2020 | Rigor | H04N 21/44008 |
| 10,880,270 B1* | 12/2020 | Rigor | H04L 63/1425 |
| 2002/0042817 A1* | 4/2002 | Lahr | H04L 67/2823 |
| | | | 709/213 |
| 2012/0150993 A1* | 6/2012 | Flack | H04W 4/18 |
| | | | 709/217 |
| 2017/0094009 A1* | 3/2017 | Wistow | H04L 67/02 |
| 2017/0212698 A1* | 7/2017 | Bhadauria | G06F 12/0888 |
| 2017/0255561 A1* | 9/2017 | Alameldeen | G06F 12/0868 |
| 2019/0147067 A1* | 5/2019 | Rigor | G06F 16/172 |
| | | | 709/217 |
| 2020/0401558 A1* | 12/2020 | Rigor | H04L 67/1097 |
| 2020/0404355 A1* | 12/2020 | Rigor | H04N 21/25841 |

* cited by examiner

210

| Compression Tool 230 | File Type 240 | Files 250 | Time 260 | Size Reduction 270 |
|---|---|---|---|---|
| Tool1 | images | abc.jpg (50kb) | 1ms | 2% |
| Tool1 | images | xyz.tif (1.2mb) | 3ms | 5% |
| Tool1 | video | Mov1.mp4 (1gb) | 16ms | 6% |
| Tool1 | video | Mov2.flv (500mb) | 11ms | 3% |
| Tool2 | images | abc.jpg (50kb) | 2ms | 8% |
| Tool2 | images | xyz.tif (1.2mb) | 3ms | 5% |
| Tool2 | video | Mov1.mp4 (1gb) | 20ms | 2% |
| Tool2 | video | Mov2.flv (500mb) | 16ms | 2% |

| ToolZ | ... | ... | 8% | 9ms |

CACHING WITH DYNAMIC AND SELECTIVE COMPRESSION OF CONTENT

CLAIM OF BENEFIT TO RELATED APPLICATIONS

This application is a divisional of U.S. nonprovisional application Ser. No. 15/814,856 entitled "Caching with Dynamic and Selective Compression of Content", filed Nov. 16, 2017, now U.S. Pat. No. 10,747,723. The contents of application Ser. No. 15/814,856 are hereby incorporated by reference.

BACKGROUND ART

A caching server accelerates content delivery by retaining a local copy of requested content closer to the requestors than an origin location from where the content is initially generated. The caching server serves local copy of the content to those requestors and the requestors receive the content without the added latency from traversing the additional network hops to the origin location. A portion of the caching server memory or storage is allocated as a cache for storing local copies of different content.

The cache is a limited resource. As such, the caching server uses various techniques to retain the content that is most frequently requested in cache. Nevertheless, there is a penalty every time a request arrives for content that is not cached, and the caching server has to retrieve the content from its origin location before serving the retrieved content to the requestor. Although increasing the amount of physical memory or storage is one way to increase the size of the cache, the number of locally cached content, and the cache-hit ratio of the caching server, the cost for doing so becomes prohibitive at some point.

File compression is another way to increase the cache size. File compression involves compressing the content files in order to reduce the file sizes before the files are entered into the cache. Compression however has shortcomings limiting its adoption for caching server applications. First, there is a performance penalty associated with decompressing compressed files from cache before they can be served to a requestor. Every millisecond is crucial to the end user experience. Decompressing a large file can take several milliseconds, and sometimes seconds. Second, compressing and decompressing content consumes processing resources of the caching server. Any such diversion of resources can slow the responsiveness of the caching server, especially when those resources are needed to receive and respond to other content requests. Third, compression in many instances can be a wasted operation. Certain files and file types receive little to no benefit from being compressed, and simply introduce the aforementioned delay while consuming server resources. In other words, there is a minimal increase in the overall cache of the caching server when compressing certain files and file types, thus providing little to no improvement in the cache-hit ratio of the caching server even though the time and resources are expended to perform the compression.

Since caching servers perform a time sensitive task, especially caching servers delivering video and audio, compression is not commonly used for content delivery applications. Nevertheless, there remains a need to improve cache-hit ratios of the caching servers without the cost of allocating additional resources. More specifically, there is a need to improve cache-hit ratios by increasing the cache of a caching server without degrading performance of that caching server.

BRIEF DESCRIPTION OF THE DRAWINGS

A preferred embodiment for caching with dynamic and selective compression of content will now be described, by way of example only, with reference to the accompanying drawings in which.

DETAILED DESCRIPTION

Disclosed are systems and methods for caching with dynamic and selective compression of content. The dynamic and selective compression of content is performed by a cache, and more specifically, a caching server leveraging at least a portion of its memory or storage to locally cache content that the caching server redistributes to different clients in response to requests for the content from the clients.

The dynamic and selective compression involves dynamically compressing different types of content or files. In particular, the dynamic compression switches between an available set of compression tools in order to compress different files with the compression tool that is optimal for that file. Each optional compression tool produces a maximum reduction in file size for a different subset of files or file types cached by the caching server relative to the other available compression tools. In summary, the dynamic switching identifies and compresses different files with different compression tools that achieve the maximum amount of compression for those individual files as compared to the other available compression tools. Thus, the same compression tool is not uniformly used in compressing all content or files cached by the caching server.

The dynamic and selective compression further involves selectively compressing the content or files with the optimal compression tool when at least a threshold amount of space savings is obtained in an acceptable amount of time. This aspect considers the amount of time to compress and decompress each file, the resource expenditure for the compression, as well as the amount of memory that is recuperated from compression by an optimal compression tool from a set of available compression tools, before deciding whether or not the file should be dynamically compressed with the optimal compression tool. In other words, even though an optimal compression tool exists for a certain file, that file may or may not be compressed depending on the expected space savings, the resource usage, and the time needed to compress and/or decompress the file. Thus, a first file of a particular type may by compressed before entry into the caching server cache, whereas a second file of the same particular type may not be compressed before entry into the caching server cache.

Figure 1:
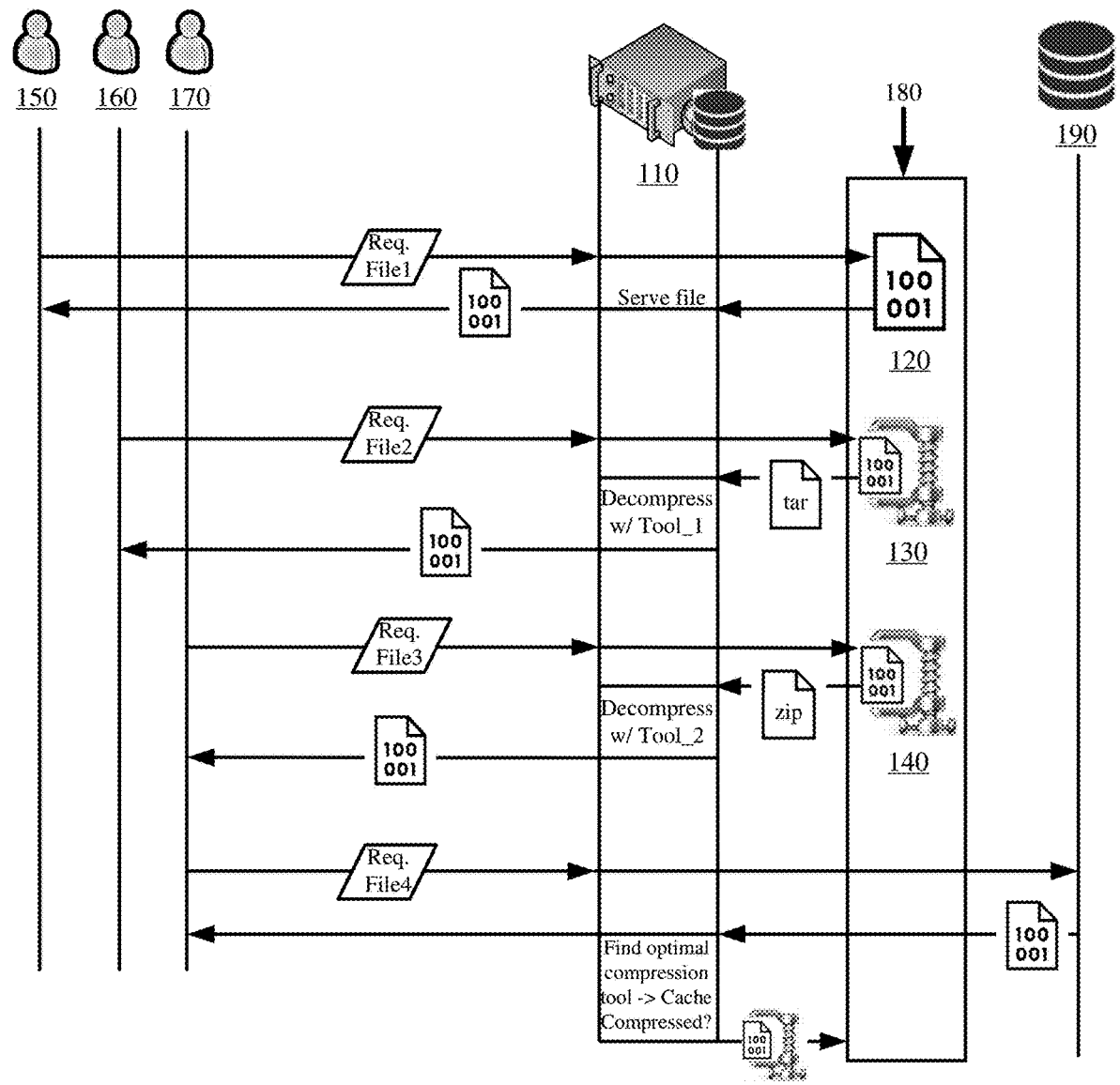
FIG. 1 conceptually illustrates the dynamic and selective compression of some embodiments.

FIG. 1 conceptually illustrates the dynamic and selective compression of some embodiments. The figure depicts a caching server 110 that receives requests for different content 120, 130, and 140 from various clients 150, 160, and 170 over a digital network, such as the Internet, and that replies with the requested content 120, 130, and 140.

The caching server 110 has a cache 180 (i.e., memory or storage). As shown, a first file or content 120 entered into the cache 180 is not compressed, a second file or content entered 130 into the cache 180 is compressed with a first compression tool that achieves maximum space reduction for the first file or content 130 relative to other compression tools available to the caching server 110, and a third file or content 140 entered into the cache 180 is compressed with a different second compression tool that achieves maximum space reduction for the second file or content 140 relative to the other compression tools available to the caching server 110. The first file or content 120 can represent a first set of files that are entered into the cache 180 without compression, the second file or content 130 can represent a second set of files of the same file type (e.g., *.mov) or different files types (e.g., different encoded video files) that are entered into the cache 180 after compression with the first compression tool, and the third file or content 140 can represent a third set of files of the same file type or different files types that are entered into the cache 180 after compression with the second compression tool.

Other requested content not in the cache is retrieved over the digital network from a remote origin or server 190. This content is served to the requesting clients and, in some cases, is also entered into the cache 180. Before entering the new content into the cache 180, the caching server 110 makes a determination as to whether or not the penalty associated with compressing the new content would be offset by the benefit obtained from the reduction in file size and a higher cache-hit ratio.

In real-world testing with traffic of a specific set of content providers delivered by a content delivery network (CDN), the dynamic and selective compression of some embodiments was found to provide nearly a 30% increase in cache size when caching mostly images and 10% increase in cache size when caching mostly videos. Further refinements as well as different application to different sets of files or content from different content providers can yield even more space savings. More importantly, the dynamic and selective compression of some embodiments was shown to improve overall content delivery performance of the CDN. The improved content delivery performance is the byproduct of an improved cache-hit ratio that resulted from the dynamic and selective compression. In summary, the penalty associated with dynamically and selectively compressing and decompressing content to cache was more than offset by the content delivery performance improvements experienced by the caching servers of the CDN as a result of having fewer retrievals from origin storage because of the increased cache-hit ratio.

Figure 2:
FIG. 2 illustrates an exemplary set of benchmarks derived for different compression tools used in compressing different files and file types.

In some embodiments, the dynamic and selective aspects are based on benchmarking average compression time, decompression time, and file size reduction of different compression tools when applied to different files types and different files of the same file type, wherein the different files can be files of a particular file type that are small in size (e.g., under 100 kilobytes) and files of the particular file type that are large in size (e.g., over one megabyte). Some different compression tools that can be applied with the dynamic and selective compression of some embodiments include: LZMA (Lempel-Ziv-Markov), LZHAM (LZ, Huffman, Arithmetic, Markov), Broth, Deflate, SDCH (Shared Dictionary Compression for HTTP), Zstd (Zstandard), Lepton, and bzip2. This is merely a listing of some compression tools that can be used with the embodiments disclosed herein. The embodiments can support any compression tool including compression tools that are specific to certain file types such as images, video streams, audio files, web content, text, FIG. 2 illustrates an exemplary set of benchmarks 210 derived for different compression tools used in compressing different files and file types. The benchmarks 210 are produced by a caching server (performing the dynamic and selective compression) that is configured with a set of different compression tools 230, that receives different client requests over some duration, and that retrieves different content in response to those requests.

Each compression tool of the set of compression tools 230 is used to compress and decompress a variety of file types 240 and different files 250 within the variety of file types included in the traffic mix received by the caching server. Different files of a particular file type are files that are of a same type but that are differentiated based on file size or another file characteristic. From each compression and decompression, a set of benchmarks are derived.

The benchmarks identify the compression and decompression time 260 and file size reduction 270 of each compression tool as applied to each of the different file types 240 and files 250. The benchmarks 210 can identify additional characteristics of the different files 250 for a more granular benchmarking of the compression tools 230. The benchmarks 210 reveal the optimal compression tool to dynamically use for the different files 250, and also, the selective aspect as to whether or not certain content should or should not be compressed with an optimal compression tool or any other compression tool available to the server.

In some embodiments, the benchmarking results are used to configure the dynamic and selective compression operation of the caching server. In particular, the caching server is configured with criteria setting some combination of file types, files, and file sizes that should not be compressed. The caching server is also configured with the optimal compression tools to be used for compression of other combinations of files, file sizes, and file types.

In some embodiments, the benchmarking is continually performed by the caching server. The continual benchmarking accounts for different usage of the caching server over time as well as different mixes of content that are requested from the caching server and served by the caching server over time. Accordingly, the dynamic and selective aspects are themselves changing over time as the content served by the caching server changes. Thus, a first benchmark at a first time may identify particular content as content that should be compressed with a first compression tool, a second benchmark at a second time may identify that the particular content should be compressed with a different second compression tool, and a third benchmark at a third time may identify that the particular content should not be compressed.

Figure 3:
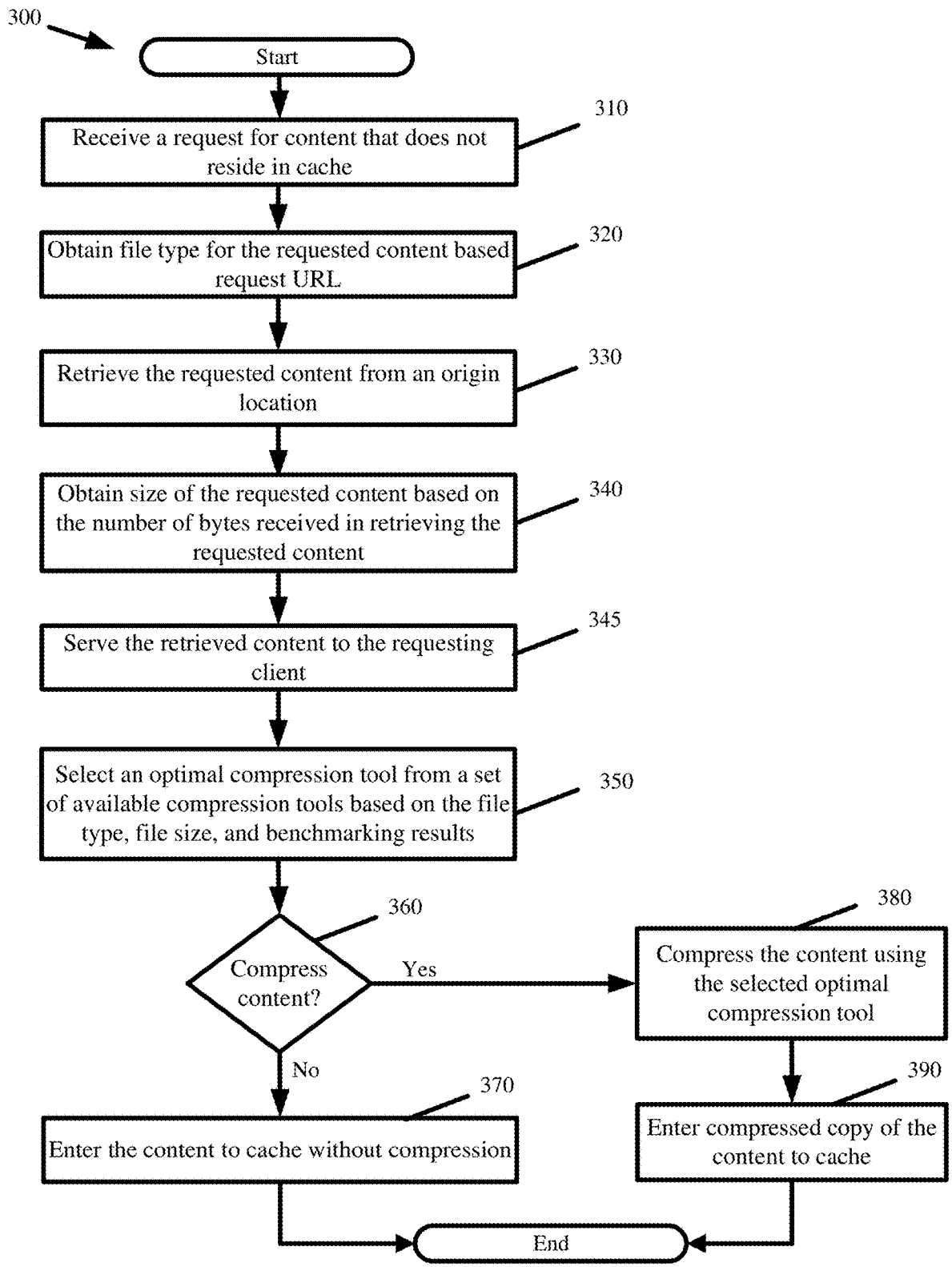
FIG. 3 presents a process for performing dynamic and selective compression in accordance with some embodiments.

FIG. 3 presents a process 300 for performing dynamic and selective compression in accordance with some embodiments. The process 300 commences in response to a caching server receiving (at 310) a request for content that does not reside in cache. In response to the requested content not residing in cache, the caching server implements the dynamic and selective compression of some embodiments. The request is typically a HyperText Transfer Protocol (HTTP) GET message. Other protocols and request messages are also supported.

The process obtains (at 320) the file type for the requested content based on the Uniform Resource Locator (URL) of the received request, or, more specifically, the file extension for the filename of the requested content in the URL. In some embodiments, the file type can be obtained from a domain name or hostname of the content provider from which the file is retrieved. For example, a site like Twitter® is typically associated with files or messages that are small in size, whereas a site like Netflix® is typically associated with large sized video files.

The process retrieves (at 330) the requested content from an origin location in response to the request resulting in a cache miss. Here, the caching server issues its own request or forwards the client issued request to the origin location and the origin location responds by passing the one or more content files to the caching server.

The process obtains (at 340) the size of the requested content based on the number of bytes received in retrieving the requested content from the origin location. The process serves (at 345) the retrieved content to the requesting client in satisfaction of the client request.

The process selects (at 350) an optimal compression tool from a set of available compression tools based on the obtained file type and file size, and also based on the results from benchmarking the set of available compression tools. From the benchmarking results, the process also selectively determines (at 360) whether the retrieved content should be compressed. In particular, the process determines whether the expected size reduction from compressing the retrieved content with the optimal compression tool is sufficient to offset the time to compress and decompress the content.

In response to the compression penalty (i.e., time to compress and decompress) outweighing the benefit from the expected reduction in file size, the process enters (at 370) the content to cache without compression. The compression penalty outweighs the benefit from the expected reduction in file size when the expected reduction from compressing with the optimal compression tool is less than a threshold amount or percentage of the original file size. The compression penalty also outweighs the benefit of compression when compression and decompression time exceeds a time threshold. For instance, the retrieved content may be content that is one gigabyte in size. The compression and decompression time for such content may exceed several seconds. The server cannot delay responding to a user request for that content by waiting several seconds for the content to be decompressed. Accordingly, in this case, regardless of the space savings, the process dynamically elects to cache the content without compression.

In response to the benefit from the reduction in the file size being greater than the compression penalty, the process compresses (at 380) the content using the optimal compression tool selected at step 350. The process then enters (at 390) the resulting compressed copy of the content to cache.

In some embodiments, compressed content is stored in cache with a modified filename. The modified filename assists the server in identifying whether the cached content is compressed and requires decompression before serving as well as which of the available compression tools to use for the decompression.

Figure 4:
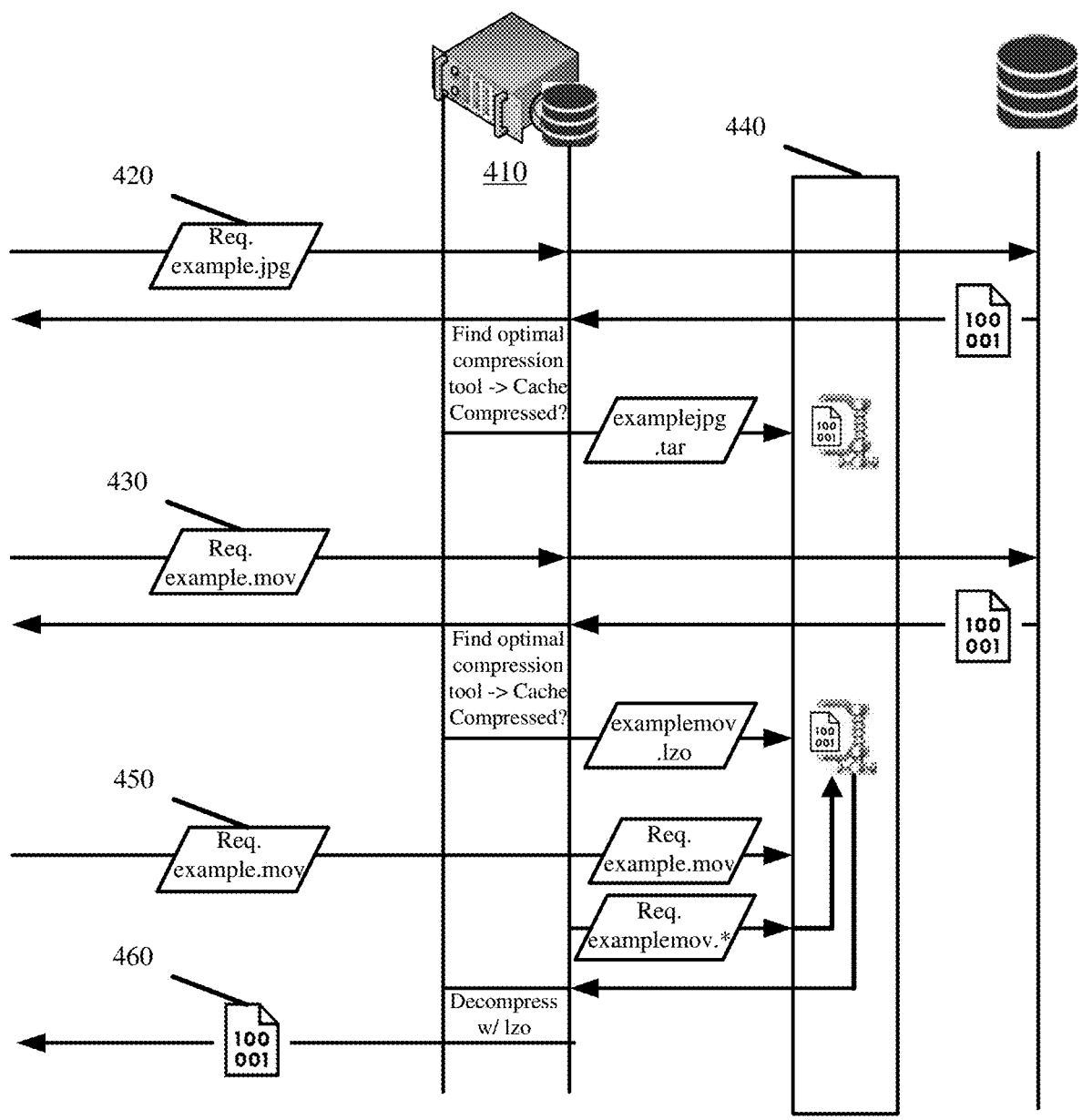
FIG. 4 conceptually illustrates modified filenames for cached content based on the dynamic and selective compression of some embodiments.

FIG. 4 conceptually illustrates modified filenames for cached content based on the dynamic and selective compression of some embodiments. The figure illustrates a server 410 that performs the dynamic and selective compression receiving requests 420 and 430 for different files that have the same name but different file extensions—"example.jpg" and "example.mov". The server 410 retrieves the content and compresses the corresponding files before storing the compressed files to cache 440. In this figure, different compression tools are used to compress each of the requested files. The compressed files have filenames of "examplejpg.tar" and "examplemov.lzo". In this figure, the modified filename concatenates the original file extension to the filename and adds a new file extension to identify the compression tool used to compress the file.

When the server 410 receives a subsequent request 450 for "example.mov", the server 410 queries the cache 440 for the original file, "example.mov", and if the original file cannot be found, the server 410 queries the cache 440 for a compressed copy of the file having the filename "examplemov" with a wildcard for the file extension. These queries can be performed sequentially or in parallel. When performed in parallel, the server 410 will provide precedence to the original file if found, because that file can be served immediately without any processing, whereas a compressed copy would have to be decompressed before serving. In this figure, the server 410 locates the "examplemov.lzo" file, identifies that the lzo compression tool was used for compression of the file based on the file extension of the compressed file, decompresses the file using the lzo compression tool, and serves the dynamically decompressed file 460 to the requestor.

Alternative methodologies may be used to differentiate and identify compressed files from uncompressed files in cache. For example, metadata may be associated with compressed files to identify the compression tools. In some embodiments, the compressed files are stored in a separate directory, whereby the directory is named according to the original file name and/or extension. The query of the directory based on the original filename will then identify any compressed variants along with metadata for identifying the compression tool used in creating the compressed variants. In some embodiments, files that are compressed with a particular compression tool are placed in a separate volume in storage and the entire volume is compressed with the particular compression tool.

Figure 5:
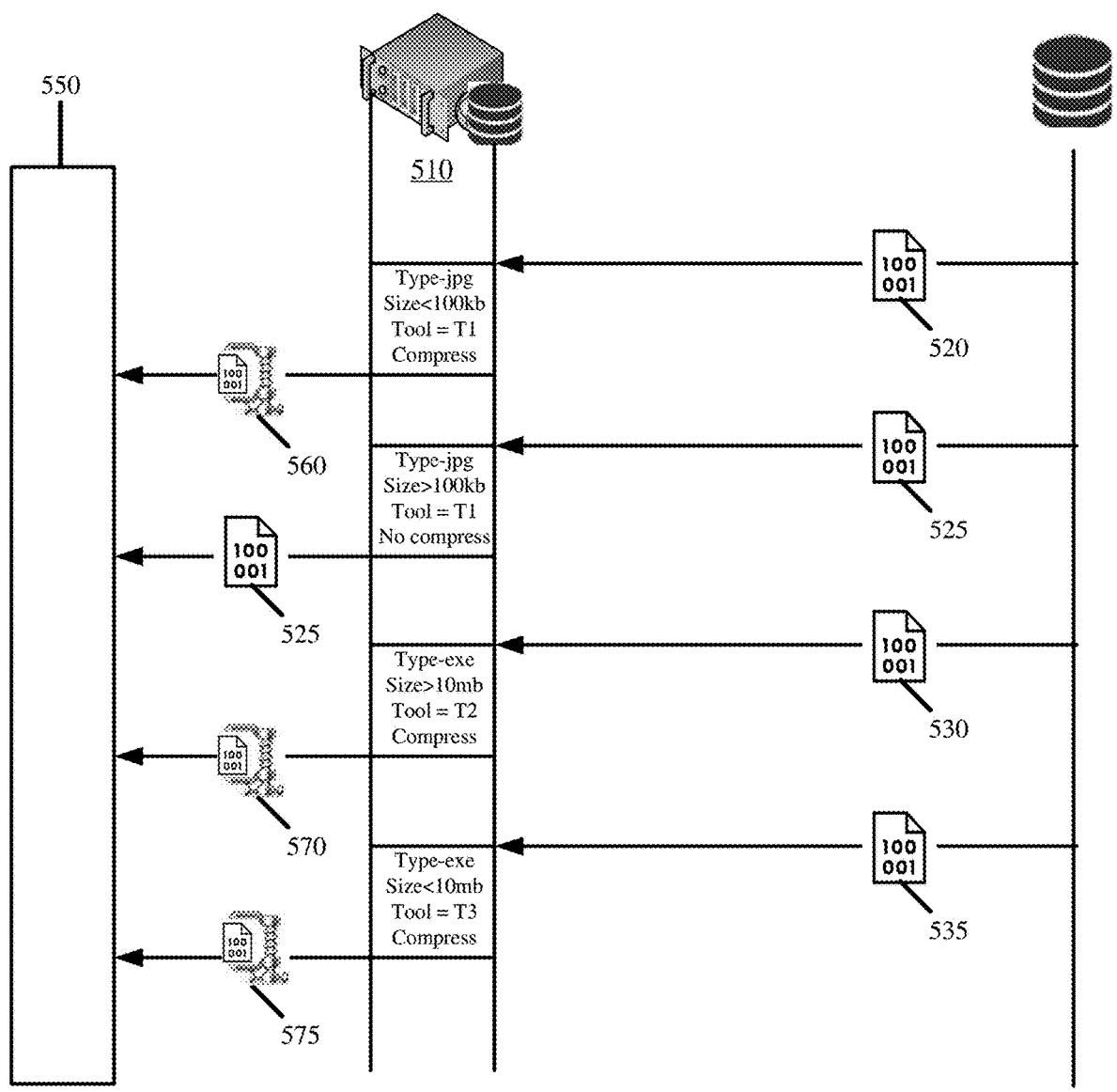
FIG. 5 conceptually illustrates a server performing dynamic and selective compression in accordance with some embodiments.

FIG. 5 conceptually illustrates a server 510 performing dynamic and selective compression in accordance with some embodiments. The figure illustrates the server 510 retrieving and caching different files 520, 525, 530, and 535 according to the dynamic and selective compression of some embodiments.

For image files, the server 510 compresses an image file 520 that is greater than 100 kilobytes in size with a first compression tool prior to entering the compressed file 560 into cache 550. An image file 525 that is less than 100 kilobytes in size is not compressed prior to caching.

For application files, the server 510 compresses an application file 530 that is greater than 10 megabytes with a second compression tool prior to entering the compressed file 570 into the cache 550. The server 510 also compresses an application file 535 that is less than 10 megabytes with a third compression tool prior to entering the compressed file 575 into the cache 550.

Other files and file types are dynamically and selectively compressed with the same or other compression tools. The cached files that are compressed are represented by their modified filenames.

In some embodiments, the dynamic and selective aspects of the solution can alter the compression and caching operation of the server with respect to the same files or file types over time. The altered behavior can be due to any one or more of the factors provided below.

One factor affecting the dynamic and selective compression operation of the caching server over time is demand or popularity. Demand can refer to the current utilization of content, whereas popularity can refer to historic utilization of content. In this disclosure, the terms are used interchangeably to refer to either or both definitions.

Figure 6:
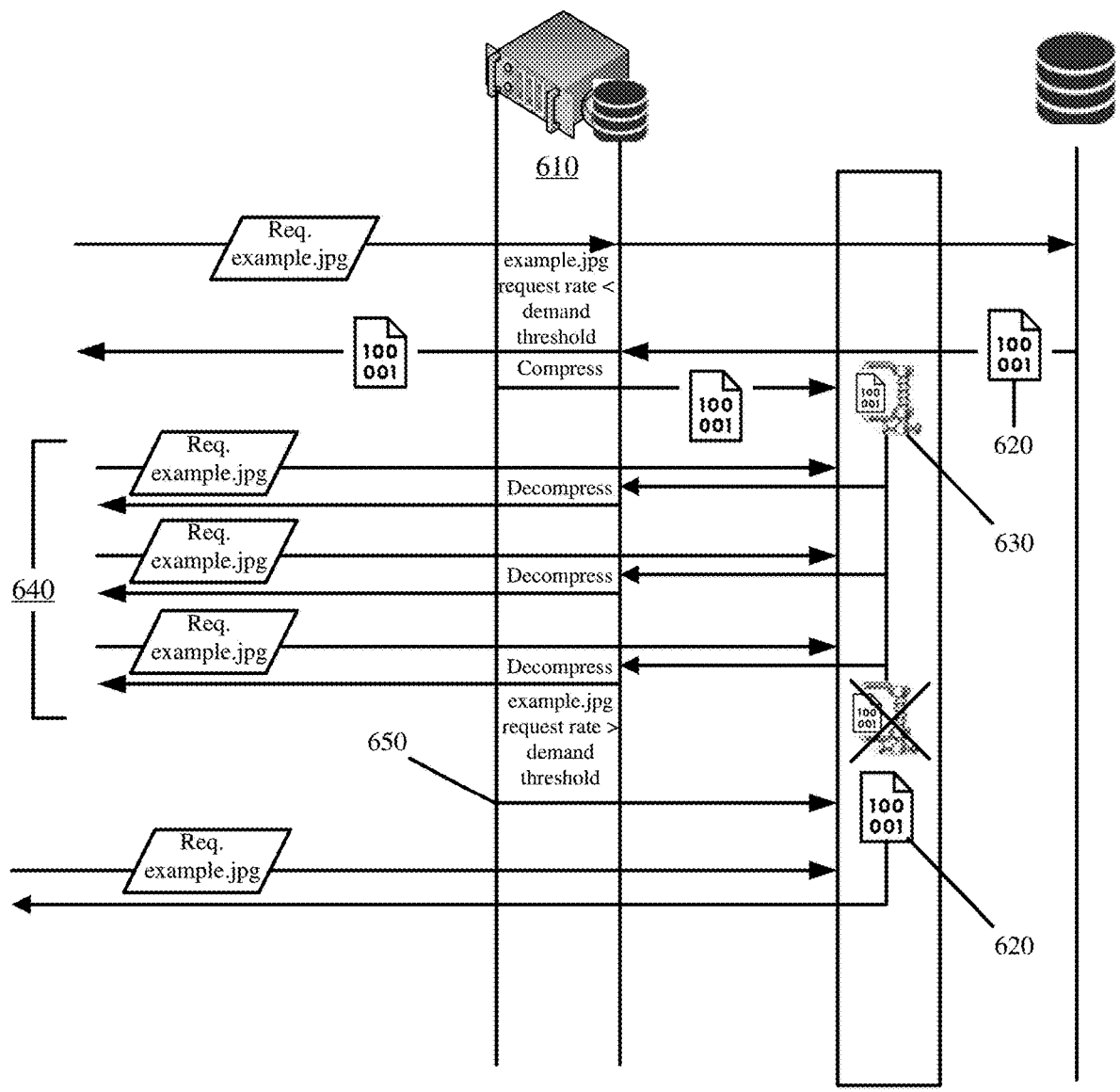
FIG. 6 conceptually illustrates modifying the dynamic and selective compression operation based on time in accordance with some embodiments.

FIG. 6 conceptually illustrates modifying the dynamic and selective compression operation based on time in accordance with some embodiments. FIG. 6 illustrates a caching server 610 receiving a first rate of requests for a particular file 620. The first rate of requests is below a specific demand threshold. Accordingly, the server 610 dynamically and selectively compresses the particular file 620 before entering the compressed copy of the particular file 630 into cache at a first time. The server 610 decompresses the compressed copy 630 and serves the original version of the particular file to subsequent requests for the particular file while the rate of requests is below the demand threshold.

During a subsequent duration 640, demand for that particular file (i.e., the number of requests for the particular file over a specified duration) spikes so as to exceed the demand threshold. After exceeding the demand threshold, the server 610 adjusts its operation with respect to the particular file such that the original uncompressed copy of the particular file 620 is cached at a later second time 650 either alongside the compressed copy of the particular file or with the compressed copy being ejected from cache.

In this figure, the space savings from compressing the particular file initially outweighs the penalty associated with compressing and decompressing the particular file. However, as the demand for the particular file increases, the penalty outweighs the benefit because the server is repeatedly having to decompress the particular file. The repeated decompression delays the server's ability to respond to the increased demand for the particular file. Each individual delay is insignificant. However, the total aggregate delay from a large spike in demand for the particular file can be significant enough to create a bottleneck, or at the very least, slow the server's ability to respond with the particular file when it needs to increase its responsiveness for the particular file. Moreover, the repeated decompression of the particular file due to the traffic spike can consume too many processing cycles that offset the one-time gain in cache space. Therefore, after the demand for the particular file exceeds the demand threshold, the server replaces the compressed copy of the particular file in cache with the original uncompressed copy so as to avoid the decompression delay when responding to each request.

Demand can also have an inverse effect on the dynamic and selective compression. Once demand for a particular file that was not previously compressed in cache wanes and the particular file is infrequently requested, the server selectively replaces the particular file in cache with a compressed variant of the compressed file. In some embodiments, the server can periodically scan the cache to identify files that no longer experience excessive demand in order to compress them. In some other embodiments, the server waits for a subsequent request before determining whether an uncompressed copy of a particular file in cache should now be compressed as a result of reduced demand for that particular file.

Another factor affecting the dynamic and selective compression operation of the caching server over time is the number of different files that are requested from the server over time. When the number of different files requested from the server over a duration is low or directed to a small set of files, the server can selectively choose to cache the set of files and other files without compression. However, when the number of different files requested from the server over the duration is high or directed to larger set of files, the server will attempt to increase its cache-hit ratio by compressing the cached files such that the cache can store more of the larger set of requested files at any given time, thereby reducing the number origin retrievals the server has to make.

Another factor affecting the dynamic and selective compression operation of the caching server over time is file updates. Content providers continually update their files. Low resolution variants of a file may be replaced with a high resolution variant. An application file may be updated with additional content or data. Alternatively, a file can be simplified and lose features or functionality. In any case, updates can change the size of a file. The change in size can alter the dynamic and selective compression performed by the server. In particular, the server may determine that a particular file at a first time is too small for compression, thereby storing that file in cache without compression. At a later time, the particular file is updated and the size of the particular file increases past the point at which the server selectively determines that the particular file should now be compressed before being entered in cache.

Another factor affecting the dynamic and selective compression operation of the caching server over time is server resource availability. When the server is performing processor intensive tasks such as acting as a service provider, performing backups, executing scripts, or performing a large number of decompressions of cached resources, the server will selectively choose to compress a smaller first set of content that is cached or is to be cached. This is to preserve the server's processor for those processor intensive tasks and avoid or minimize the processing cycles for decompression. When the server has a sufficient percentage or amount of free processing cycles and memory is at a premium, the server adapts its operation so as to selectively compress a larger second set of content that is cached or is to be cached.

Figure 7:
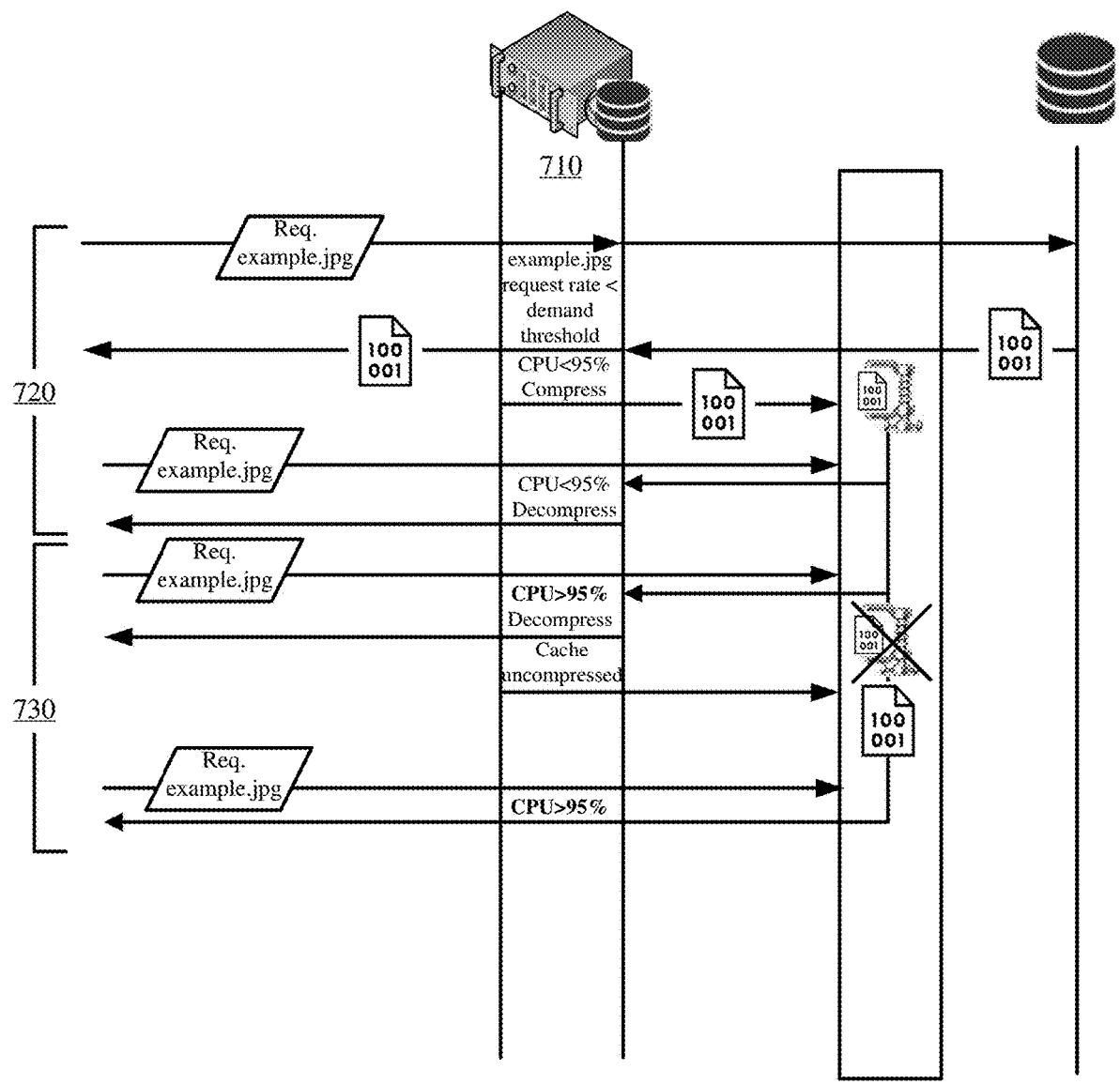
FIG. 7 illustrates modifying the dynamic and selective compression based on server resource availability in accordance with some embodiments.

FIG. 7 illustrates modifying the dynamic and selective compression based on server resource availability. In this figure, the server 710 processor utilization is below a specific threshold during a first duration 720. During the first duration 720, the server 710 has processor resources it can devote to compressing and decompressing content. Accordingly, the content requested during the first duration is compressed and the compressed variant is cached. Requests are responded to by decompressing cached copies of the requested file (if cached) and serving the uncompressed file. At a later second duration 730, the server 710 has fewer available processor cycles. In other words, the processor usage exceeds a usage threshold. To preserve resources, content that the server 710 would previously compress is no longer compressed before entering into the cache. Accordingly, the server 710 can respond to requests directly from cache without decompressing the cached content.

Another factor affecting the dynamic and selective compression operation of the caching server over time is quality of service. The server is more responsive when responding to requests with cached content that is not compressed than when responding to requests with cached content that is compressed because of the time and resources required to decompress the compressed content before it can be served. Accordingly, the server can provide different content providers different quality of service by selectively compressing content of a first set of content providers before entry to cache and by not compressing content of a different second set of content providers before entry to cache. The server can provide the differentiated quality of service based on expected demand for the content of the different content providers and also based on different fees the content providers pay for the server to deliver their content. The differentiated quality of service may also be provided to a first set of content providers with content that is not cacheable or compressible and a second set of content providers with content that is cacheable or compressible.

Some embodiments enhance each of the above dynamic and selective compression operations with a two-phase eviction. The two-phase eviction modifies the eviction policies of the server so as to maximize cache storage or cache performance as the server cache becomes full. As part of the two-phase eviction, the server will not immediately purge content from cache in order to make room for other content. Instead, the server will remove the content from cache, compress the content, and store the content to cold storage. Cold storage may refer to a slower or less frequently accessed storage medium of the server. For instance, cache may refer to fast random-access memory and cold storage may refer to slower mechanical disk.

When the server receives a request for content, the server can first inspect the cache for a copy. If the content does not reside in cache, the server can then inspect the cold storage. If the content does not reside in the cold storage, the server can then retrieve the content from a remote origin location. However, retrieving and/or decompressing a copy of the content from cache or cold storage remains faster than retrieving the content from a remote origin location.

Compressed content can be retained in the cold storage until the cold storage begins to fill and exceed a size threshold. Once the size threshold for the cold storage is exceeded, the least frequently used files or content can be removed therefrom, thereby completely deleting those files or content from the server.

A different implementation of the two-phase eviction could select certain content for immediate deletion from cache and other content for compressed storage in the cold storage before deletion from cache. Demand, popularity, update rate, quality of service, or other criteria can be used to make the selection between immediate deletion and long term compressed storage in the cold storage.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
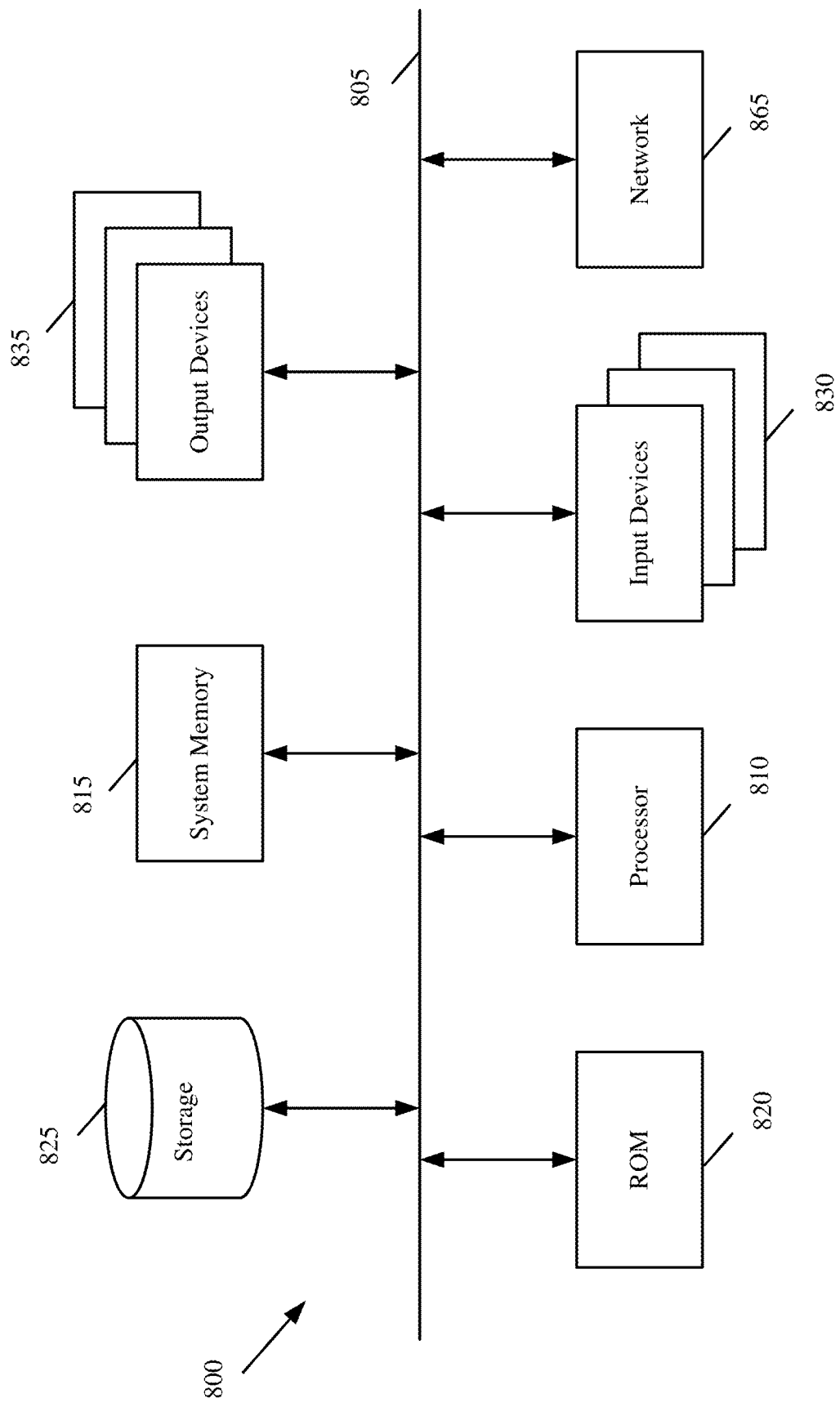
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., caching server, origin server, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device. Like the permanent storage device 825, the system memory 815 is a read-and-write memory device. However, unlike storage device 825, the system memory is a volatile read-and-write memory, such as random-access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable Blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:
   retrieving, at a particular server, a first file over a digital network from a remote server;
   monitoring, at the particular server, a number of requests received for the first file over an interval;
   caching, by the particular server, a compressed copy of the first file into memory of the particular server in response to the number of requests falling below a demand threshold;
   replacing, by the particular server, the compressed copy in the memory with an uncompressed instance of the first file in response to the number of requests exceeding said demand threshold; and
   increasing a number of cached files that are stored in the memory of the particular server by caching, in the memory, compressed copies of a first set of files, that receive a first amount of demand less than the demand threshold, and by caching, in the memory, uncompressed instances of a second set of files, that receive a second amount of demand greater than the demand threshold.

2. The method of claim 1, wherein caching the compressed copy comprises:
   selecting a particular compression tool for the first file from a plurality of compression tools; and
   compressing the first file with the particular compression tool, wherein the particular compression tool produces a greater reduction in size of the first file than other compression tools of the plurality of compression tools.

3. The method of claim 2, wherein selecting the particular compression tool comprises:
   determining a type of the first file;
   tracking different amounts of compression produced by each compression tool of the plurality of compression tools for files of different types; and
   determining that the particular compression tool produces the greater reduction in size of the first file than the other compression tools of the plurality of compression tools based on said tracking and the type of the first file.

4. The method of claim 1 further comprising:
   retrieving, at the particular server, a second file over the digital network;
   identifying a number of different files requested from the particular server over a duration;
   caching a compressed copy of the second file into the memory of the particular server in response to the number of different files exceeding a particular count; and
   caching the second file into the memory of the particular server without compression in response to the number of different files not exceeding the particular count.

5. The method of claim 1 further comprising:
   retrieving, at the particular server, a second file over the digital network;
   identifying processor utilization at the particular server over a duration;
   caching a compressed copy of the second file into the memory of the particular server in response to the processor utilization falling below a utilization threshold; and
   replacing the compressed copy of the second file in the memory with an uncompressed instance of the second file in response to the processor utilization exceeding the utilization threshold.

6. The method of claim 1 further comprising:
   determining a size of the first file;
   wherein caching the compressed copy comprises:
      determining an amount of storage space that is saved by compressing the first file;
      determining an amount of time to compress the first file; and
      compressing the first file based on the amount of the storage space that is saved and the amount of time to compress the first file being within acceptable thresholds; and
   wherein replacing the compressed copy comprises:
      storing the first file into the memory without compression in response to the number of requests falling below the demand threshold or the amount of the storage space that is saved and the amount of time to compress the first file not being within the acceptable thresholds.

7. The method of claim 1, wherein caching the compressed copy comprises:
   selecting a first compression from a plurality of different compressions based on a type of the first file; and
   compressing the first file using the first compression.

8. The method of claim 7 further comprising:
   retrieving, at the particular server, a second file over the digital network;
   selecting a different second compression from the plurality of different compressions based on the second file being of a different type than the first file; and
   caching, by the particular server, a copy of the second file, that is compressed using the second compression, into the memory.

9. The method of claim 8, wherein the first compression provides a greater amount of data compression of the first file than the second compression, and wherein the second compression provides a greater amount of data compression of the second file than the first compression.

10. The method of claim 1, wherein caching the compressed copy comprises:
    generating the compressed copy of the first file with an identifier that identifies (i) an original name of the first file, (ii) an original file extension of the first file, and (iii) an identifier for a compression used to compress the first file.

11. The method of claim 1 further comprising:
    receiving a request for the first file after caching the compressed copy;
    identifying the compressed copy of the first file in the memory;
    selecting a particular compression from a plurality of compressions based on an identifier associated with the compressed copy;
    decompressing the compressed copy with the particular compression; and
    serving the first file without compression after said decompressing.

12. The method of claim 1 further comprising:
    serving the first file with a first amount of delay during a first part of the interval when the number of requests is below the demand threshold, wherein serving the first file with the first amount of delay comprises:

decompressing the compressed copy in response to a first request for the first file received during the first part of the interval; and providing the first file after said decompressing; and serving the first file with a lesser second amount delay during a second part of the interval when the number of requests surpass the demand threshold, wherein serving the first file with the second amount of delay comprises:

providing the uncompressed instance of the first file directly from the memory in response to a second request for the first file received during the second part of the interval.

13. The method of claim 1 further comprising:

replacing, by the particular server, the compressed copy in the memory with an uncompressed instance of the first file in response to one or more resources of the particular server falling below a resource threshold.

14. The method of claim 13, wherein caching the compressed copy comprises determining that the one or more resources are available for file decompression in response to the one or more resources exceeding the resource threshold during a first time; and wherein replacing the compressed copy comprises determining that the one or more resources are not available for file decompression in response to the one or more resources falling below the resource threshold.

15. The method of claim 1, wherein caching the compressed copy comprises:

storing an uncompressed instance of a second file with the compressed copy of the first file in the memory in response to a number of requests received for the second file over the interval exceeding said demand threshold while the number of requests received for the first file over the interval falls below the demand threshold.

16. The method of claim 1, wherein the first file is of a particular file type and has a first size;

wherein caching the compressed copy comprises:

selecting a particular compression based on the particular file type; and compressing the first file with the particular compression based on the particular compression producing an estimated first size reduction for files of the particular file type having the first size;

the method further comprising:

retrieving a second file that is of the particular file type and has a different second size; and caching an uncompressed instance of the second file in the memory based on the particular compression producing an estimated second size reduction for files of the particular file type having the second size, wherein the estimated second size reduction is less than the estimated first size reduction.

17. The method of claim 1, wherein caching the compressed copy comprises:

determining an amount of time to compress the first file based on a benchmark of a particular compression that is selected for compressing the first file;

generating the compressed copy of the first file with the particular compression in response to determining that the amount of time is less than a time threshold; and storing the uncompressed instance of the first file in response to determining that the amount of time is greater than the time threshold.

18. A device comprising:

a storage;

one or more processors configured to:

retrieve a first file over a digital network from a remote server;

monitor a number of requests received for the first file over an interval;

cache a compressed copy of the first file into the storage in response to the number of requests falling below a demand threshold;

replace the compressed copy in the storage with an uncompressed instance of the first file in response to the number of requests exceeding said demand threshold; and increase a number of cached files that are stored in the storage by caching, in the storage, compressed copies of a first set of files, that receive a first amount of demand less than the demand threshold, and by caching, in the storage, uncompressed instances of a second set of files, that receive a second amount of demand greater than the demand threshold.

19. A method comprising:

retrieving, at a particular server, a first file over a digital network from a remote server;

monitoring, at the particular server, a number of requests received for the first file over an interval;

caching, by the particular server, a compressed copy of the first file into memory of the particular server in response to the number of requests falling below a demand threshold;

serving the first file with a first amount of delay at a first time when the number of requests is below the demand threshold, wherein serving the first file with the first amount of delay comprises:

decompressing the compressed copy in response to a first request for the first file received at the first time; and providing the first file after said decompressing;

replacing, by the particular server, the compressed copy in the memory with an uncompressed instance of the first file in response to the number of requests exceeding the demand threshold; and serving the first file with a lesser second amount delay at a second time when the number of requests exceed the demand threshold, wherein serving the first file with the second amount of delay comprises:

providing the uncompressed instance of the first file directly from the memory in response to a second request for the first file received at the second time.

20. A device comprising:

a storage;

one or more processors configured to:

retrieve a first file over a digital network from a remote server;

monitor a number of requests received for the first file over an interval;

cache a compressed copy of the first file into the storage in response to the number of requests falling below a demand threshold;

serve the first file with a first amount of delay at a first time when the number of requests is below the demand threshold, wherein serving the first file with the first amount of delay comprises:

decompressing the compressed copy in response to a first request for the first file received at the first time; and providing the first file after said decompressing;
replace the compressed copy in the storage with an uncompressed instance of the first file in response to the number of requests exceeding the demand threshold; and
serve the first file with a lesser second amount delay at a second time when the number of requests exceed the demand threshold, wherein serving the first file with the second amount of delay comprises:
providing the uncompressed instance of the first file directly from the storage in response to a second request for the first file received at the second time.

21. A method comprising:
retrieving, at a particular server, a first file over a digital network from a remote server;
monitoring, at the particular server, a number of requests received for the first file over an interval;
caching, by the particular server, a compressed copy of the first file into memory of the particular server at a first time in response to the number of requests falling below a demand threshold at the first time and availability of one or more resources of the particular server used for file decompression exceeding a resource threshold at the first time;
replacing, by the particular server, the compressed copy in the memory with an uncompressed instance of the first file at a second time in response to the number of requests exceeding the demand threshold at the second time; and
replacing, by the particular server, the compressed copy in the memory with an uncompressed instance of the first file at the second time in response to the availability of the one or more resources falling below the resource threshold and not being available for file decompression at the second time.

22. A device comprising:
a storage;
one or more processors configured to:
retrieve a first file over a digital network from a remote server;
monitor a number of requests received for the first file over an interval;
cache a compressed copy of the first file into the storage at a first time in response to the number of requests falling below a demand threshold at the first time and availability of one or more resources of the particular server used for file decompression exceeding a resource threshold at the first time; and
replace the compressed copy in the storage with an uncompressed instance of the first file at a second time in response to the number of requests exceeding the demand threshold at the second time; and
replace the compressed copy in the memory with an uncompressed instance of the first file at the second time in response to the availability of the one or more resources falling below the resource threshold and not being available for file decompression at the second time.

* * * * *